United States Patent
Qiu et al.

(10) Patent No.: US 9,170,108 B1
(45) Date of Patent: Oct. 27, 2015

(54) CONTROLLED MODULATION OF LIGHT BEAM WITH HIGHLY STABLE SUPPRESSION OF CARRIER OR SIDEBANDS

(71) Applicant: Honeywell International Inc., Morristown, NJ (US)

(72) Inventors: Tiequn Qiu, Glendale, AZ (US); Glen A. Sanders, Scottsdale, AZ (US); Jianfeng Wu, Tucson, AZ (US); Lee K. Strandjord, Tonka Bay, MN (US)

(73) Assignee: Honeywell International Inc., Morristown, NJ (US)

( * ) Notice: Subject to any disclaimer, the term of this patent is extended or adjusted under 35 U.S.C. 154(b) by 21 days.

(21) Appl. No.: 14/303,174

(22) Filed: Jun. 12, 2014

(51) Int. Cl.
  *G01C 19/72* (2006.01)
  *H01S 3/13* (2006.01)

(52) U.S. Cl.
  CPC ............ *G01C 19/721* (2013.01); *H01S 3/1304* (2013.01); *H01S 3/1305* (2013.01)

(58) Field of Classification Search
  CPC ... H01S 3/1304; H01S 3/1305; H01S 3/0014; H01S 3/0057; H01S 3/0085
  See application file for complete search history.

(56) References Cited

U.S. PATENT DOCUMENTS

| 6,178,036 B1 | 1/2001 | Yao | |
| 6,359,913 B1 * | 3/2002 | Lodenkamper | H01S 3/10092 372/18 |
| 6,580,532 B1 | 6/2003 | Yao et al. | |
| 7,187,821 B2 | 3/2007 | Matsui et al. | |
| 7,848,370 B2 | 12/2010 | Kewitsch et al. | |
| 7,933,020 B1 * | 4/2011 | Strandjord | G01C 19/727 356/461 |
| 8,923,352 B2 * | 12/2014 | Strandjord | G01C 19/727 356/213 |
| 2010/0225897 A1 * | 9/2010 | Fermann | G01N 21/31 356/51 |
| 2011/0038026 A1 * | 2/2011 | Skliar | G02B 7/005 359/257 |

FOREIGN PATENT DOCUMENTS

WO   2013117216   8/2013

* cited by examiner

*Primary Examiner* — Gregory J Toatley
*Assistant Examiner* — Shawn Decenzo
(74) *Attorney, Agent, or Firm* — Fogg & Powers LLC

(57) ABSTRACT

A light-source system to output at least one stable phase modulated coherent light beam is provided. The light-source system includes a multi-frequency laser system, at least one phase modulator, at least one feedback photodetector, and at least one modulation servo. The multi-frequency laser system emits a reference light beam and provides at least one unmodulated-light beam having a respective at least one carrier frequency offset from the reference carrier frequency. The phase modulator modulates the unmodulated-light beam provided by the multi-frequency laser system. The frequency-selection device monitors a frequency component of interest. The feedback photodetector provides information indicative of beat frequencies between the reference light beam and the modulated-light beam. The modulation servo adjusts a modulation amplitude applied to the phase modulator to substantially suppress one of: the respective electric field at a carrier frequency; or the electric field components at the frequencies associated with a selected sideband-pair.

20 Claims, 10 Drawing Sheets

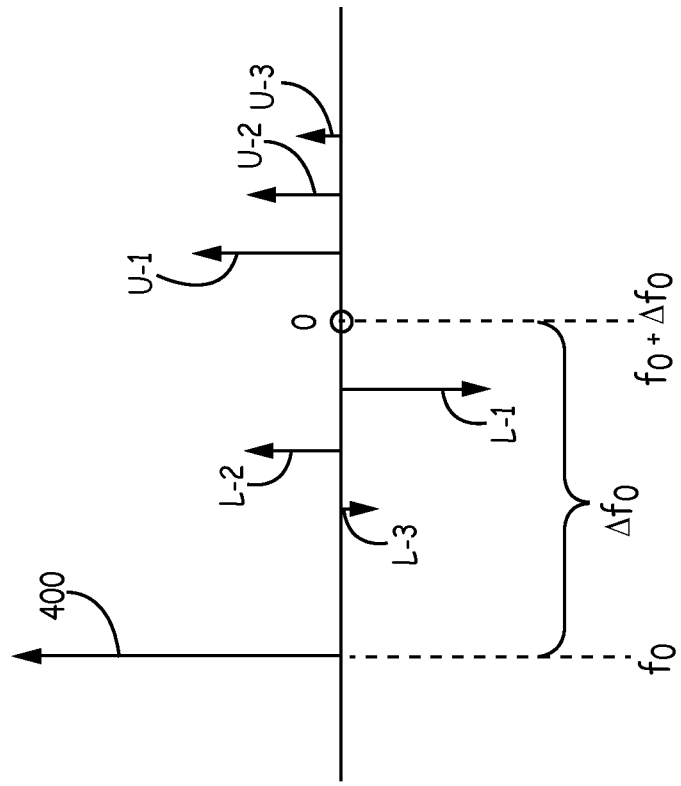
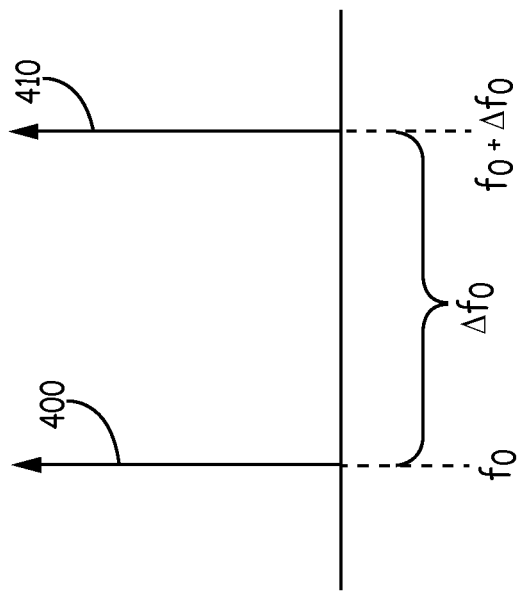
FIG. 3B
FIG. 3A

CONTROLLED MODULATION OF LIGHT BEAM WITH HIGHLY STABLE SUPPRESSION OF CARRIER OR SIDEBANDS

BACKGROUND

In the operation of a resonator fiber optic gyroscope (RFOG), there is often a need to suppress either the optical carrier or certain sidebands of the modulated-light beam to reduce errors caused by optical interference. This interference may take place between co-propagating or counter-propagating lightwaves due to back reflections in the resonator. For gyros to achieve good performance it is critical to maintain high level of suppression of a selected frequency component over long periods of time. However, due to environmental influences, it is often hard to stably maintain suppression of selected sidebands or of the carrier frequency of a modulated optical wave.

SUMMARY

The present application relates to a light-source system to output at least one stable phase modulated coherent light beam. The light-source system includes a multi-frequency laser system, at least one phase modulator, at least one feedback photodetector, and at least one modulation servo. The multi-frequency laser system emits a reference light beam having a reference carrier frequency and provides at least one unmodulated-light beam phase locked to the reference beam having a respective at least one carrier frequency that is offset from the reference carrier frequency by a respective at least one frequency difference. The at least one phase modulator modulates the respective at least one unmodulated-light beam provided by the multi-frequency laser system. The at least one frequency-selection device monitors a respective at least one frequency component of interest. The at least one feedback photodetector provides, to the respective at least frequency-selection device, information indicative of beat frequencies between the reference light beam and the at least one modulated-light beam. The at least one modulation servo adjusts a modulation amplitude applied to the respective at least one phase modulator to substantially suppress one of: the respective electric field at at least one carrier frequency; or the electric field components at the frequencies associated with a selected sideband-pair of the at least one modulated-light beam.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 3A shows an exemplary relationship between the carrier frequency of the reference laser and the carrier frequency of a first laser in the two-laser architecture light-source system of FIG. 2;

FIG. 3B shows an exemplary relationship between the carrier frequency of the reference laser and frequencies associated with three sideband-pairs of the modulated-light beam;

In accordance with common practice, the various described features are not drawn to scale but are drawn to emphasize specific features relevant to the exemplary embodiments. Reference characters denote like elements throughout figures and text.

DETAILED DESCRIPTION

Figure 1:
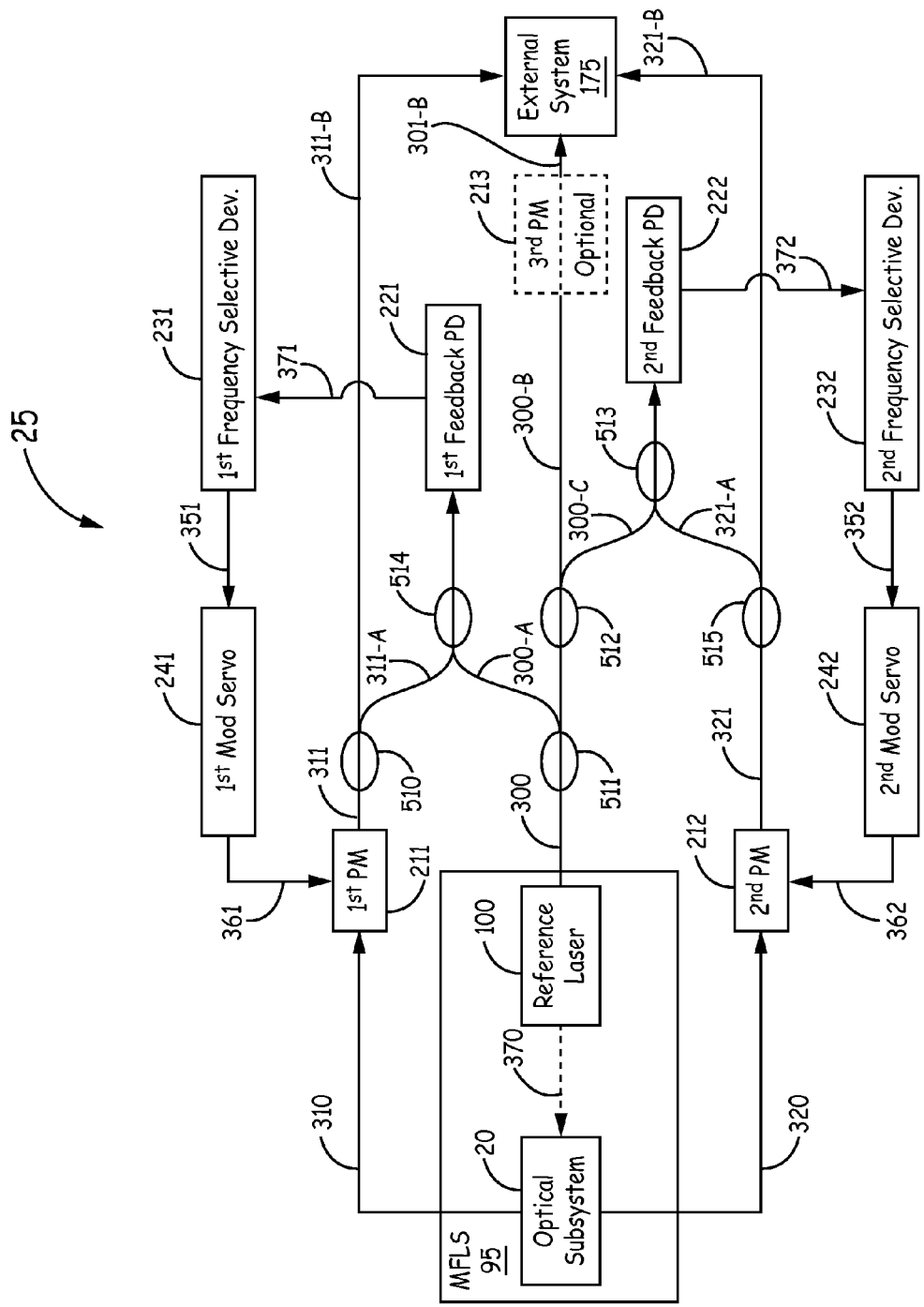
FIG. 1 is a block diagram of an embodiment of a light-source system configured to output at least one stable phase modulated coherent light beam in accordance with the present application.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments light-source systems described herein output at least one stably phase modulated coherent light beam. Specifically, light-source systems described below substantially suppress the light electric field amplitude in either the carrier frequency or frequencies associated with a selected sideband-pair of a phase modulated coherent light beam by monitoring beat signals between a reference carrier frequency $f_0$ and the carrier frequency of the modulated light or by monitoring beat signals between $f_0$ and frequencies associated with a selected sideband-pair. Based on the monitoring, at least one phase modulation amplitude adjustment signal is provided to a phase modulator in order to reduce to or maintain the suppressed frequency component at zero amplitude. This suppression is maintained even as the environment and the $V_\pi$ (voltage to produce it radiance of phase) of the phase modulator changes. The reference carrier frequency $f_0$ is associated with an unmodulated reference light beam emitted by a reference laser. The fixed carrier frequency associated with light beam from an optical subsystem that is modulated by the phase modulator. Likewise, the frequencies associated with a selected sideband-pair are associated with modulated light beam.

The embodiments light-source systems described below also maintain a selected frequency difference $\Delta f_0$ between the reference carrier frequency $f_0$ of the reference laser and at least one other optical beam (light beam) generated by the optical subsystem in the light-source system. For example, embodiments light-source systems described herein maintain a selected frequency difference $\Delta f_0$ between the reference carrier frequency $f_0$ of the reference laser and the carrier frequency $f_1$ of another laser in the light-source system. The selected frequency difference $\Delta f_0$ is maintained based on beat frequencies between the reference carrier frequency $f_0$ and the carrier frequency $f_1$ of unmodulated-light beam emitted from the other laser by an optical phase locked loop. The light-source system outputs the modulated-light beam emitted by the laser with a stably suppressed light intensity in either the carrier frequency or the sideband-pair frequencies. The stably phase modulated coherent light beam with a stably suppressed carrier frequency or with a stably suppressed sideband-pair frequencies can be used in an optical sensing system or a fiber optical communication system.

In one implementation of this embodiment, at least two stably phase modulated coherent light beams are output from the light-source system to be used in at least one external system (e.g., an RFOG system). For example, a first laser is modulated to stably suppress a fixed carrier frequency and is coupled to a counter clockwise (CCW) input port of a sensing coil of the RFOG while an a second laser is modulated to stably suppress a fixed carrier frequency and is coupled to a clockwise (CW) input port of the sensing coil of the RFOG. In this case, the light beam emitted by the first laser and the second laser are such modulated that the sidebands of the first laser do not overlap with the sidebands of the second laser. The sensing coil of the RFOG is also referred to herein as a "resonator" of the RFOG. In one implementation of this embodiment, a portion of the reference light beam emitted from the reference laser is modulated and coupled into the sensor coil of the RFOG and locked to a resonance of the sensor coil.

FIG. 1 is a block diagram of an embodiment of a light-source system 25 configured to output at least one stable phase modulated coherent light beam in accordance with the present application. The light-source system 25 includes a multi-frequency laser source (MFLS) 95, at least one phase modulator 211, at least one frequency-selection device 231, at least one feedback photodetector 221, and at least one modulation servo 241. The light-source system 25 outputs stable phase modulated coherent light beams 311-B and 321-B to an external system 175.

Figure 3C:
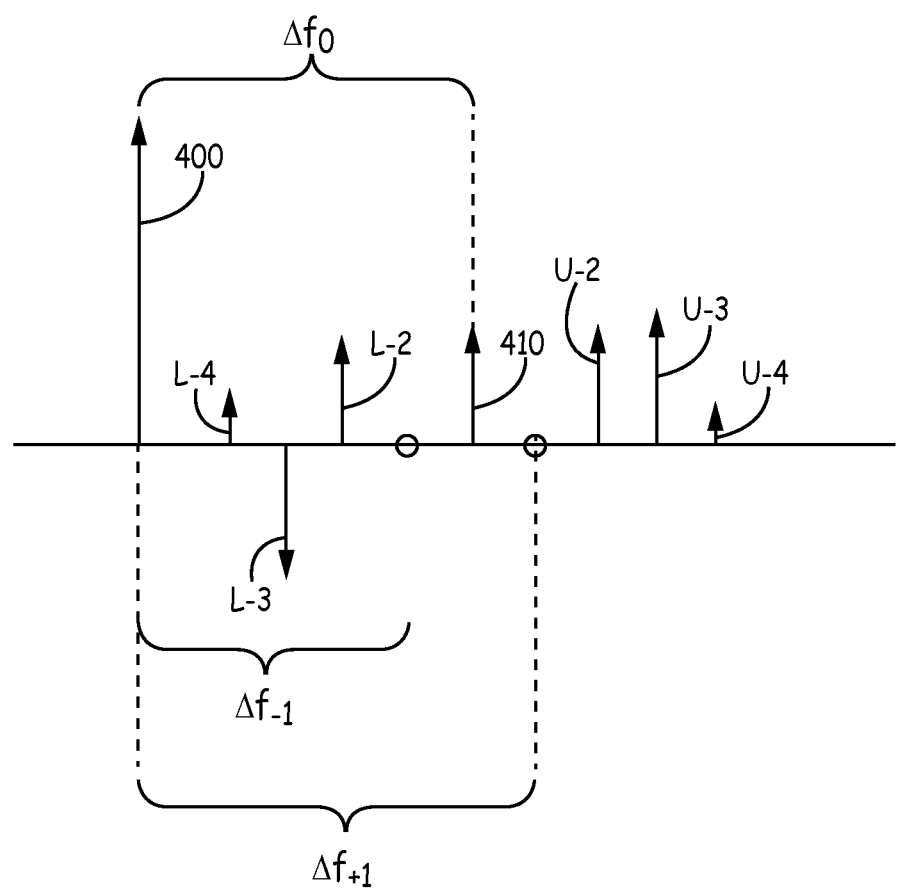
FIG. 3C shows an exemplary relationship between the carrier frequency of the reference laser, the carrier frequency of the first laser, and frequencies associated with two sideband-pairs of the first laser.

The multi-frequency laser source (MFLS) 95 emits a reference light beam 300 (from a reference laser 100) with a reference carrier frequency $f_0$, and at least one unmodulated-light beam 310 which is subsequently modulated by the respective at least one phase modulator 211 with a modulation amplitude that is selected to suppress one of a carrier frequency or frequencies associated with a selected sideband-pair of the modulated optical beam as described below. The term "sideband-pair" as used herein applies to the pair of upper sideband and lower sideband for a given harmonic. The term "frequencies associated with a selected sideband-pair" as used herein refers to the frequencies of the both the upper sideband and lower sideband for a given harmonic. Thus, if the amplitude of the modulation of the phase modulator is set to suppress the electric field amplitude of the light at frequencies associated with an $n^{th}$ sideband-pair, both the electric field amplitude of the frequency component of the upper sideband and the electric field of the frequency component of the lower sideband for the $n^{th}$ harmonic are suppressed as shown in FIG. 3C.

As shown in FIG. 1, the MFLS 95 outputs a unmodulated-first light beam 310 with a first-fixed carrier frequency $f_1$ that is offset from the reference carrier frequency $f_0$ by a first frequency difference $\Delta f_{01}$ and a unmodulated-second light beam 320 with a second-fixed carrier frequency $f_2$ that is offset from the reference carrier frequency $f_0$ by a second frequency difference $\Delta f_{02}$. In one implementation of this embodiment, the first frequency difference $\Delta f_{01}$ may equal the second frequency difference $\Delta f_{02}$ so the first carrier frequency $f_1$ may equal the second carrier frequency $f_2$.

As shown in FIG. 1, the at least one phase modulator includes a first phase modulator 211 and a second phase modulator 212. As shown in FIG. 1, the at least one frequency-selection device includes a first frequency-selection device 231 to monitor a first frequency component of interest $\Delta f_{selected-1}$ and a second frequency-selection device 232 to monitor a second-frequency component of interest $\Delta f_{selected-2}$. As shown in FIG. 1, the least one feedback photodetector includes a first-feedback photodetector 221 and a second-feedback photodetector 222.

The first phase modulator 211 modulates the unmodulated-first light beam 310 emitted from the MFLS 95 to generate a modulated-first light beam 311. As shown in FIG. 1, the portion 300-A of the reference light beam 300 and the portion 311-A of the modulated-first light beam 311 are directed to the first-feedback photodetector 221 by couplers 510, 511 and 514. The first-feedback photodetector 221 provides signal 371, to the first frequency-selection device 231. Signal 371 includes information indicative of beat frequencies between the reference light beam 300-A and the modulated-first light beam 311-A. The first frequency-selection device 231 outputs a control signal 351 to the first modulation servo 241. Based on the control signal 351, the first modulation servo 241 adjusts a first modulation amplitude applied to the first phase modulator 211 so that the first frequency component of interest $\Delta f_{selected-1}$ (also referred to herein as a "first selected frequency") is substantially suppressed in the beat note. In this manner, the modulated-first light beam 311 is a stable phase modulated coherent light beam 311 that is output, with a specific optical frequency component that is suppressed, as optical beam 311-B, to an external system 175.

The second phase modulator 212 modulates the unmodulated-second light beam 320 emitted from the optical subsystem 20 to generate a modulated-second light beam 321. As shown in FIG. 1, the portion 300-C of the reference light beam 300 and the portion 321-A of the modulated-second light beam 321 are directed to the second-feedback photodetector 222 by couplers 511, 512, 513, and 515. The second-feedback photodetector 222 provides a signal 372, to the second frequency-selection device 232. Signal 372 includes information indicative of beat frequencies between the reference light beam 300-C and the modulated-second light beam 321-A. The second frequency-selection device 232 outputs a control signal 352 to the second modulation servo 242. Based on the control signal 352, the second modulation servo 242 adjusts a second modulation amplitude applied to the second phase modulator 212 so that a second frequency component of interest $\Delta f_{selected-2}$ (also referred to herein as a "second selected frequency") is substantially suppressed in the beat note. In this manner, the modulated-second light beam 321 is a stable phase modulated coherent light beam 321 that is output, with a specific optical frequency component that is suppressed, as optical beam 321-B to an external system 175.

As known to one skilled in the art, the phase modulation amplitude determines the intensity of the carrier and the sidebands of the modulated output based on the following equation:

$$E(n\omega) = J_n(M) E_0 e^{(in\omega t)} \qquad \text{Eq. (1)}$$

where the electric field of the $n^{th}$ sideband (harmonic) (n=0 for the carrier frequency) is proportion to the Bessel function $J_n(M)$ for a phase modulation amplitude M in unit of radians. Precise control of M to certain values substantially suppresses the optical electric field components at frequencies associated with a selected sideband-pair or the carrier frequency.

In the embodiments of light beam sources described herein, the modulation amplitude is precisely controlled by setting M to select values to substantially suppress the carrier frequency for both the first light beam 311 and the second light beam 321. For example when M=2.405 or M=5.52, $J_0(M)=0$, and the carrier electric field amplitude equals zero and is thus suppressed. Other larger values of M may also suppress the carrier electric field amplitude as is known to one skilled in the art.

However, in prior art technology, it is difficult to consistently maintain suppression of the modulation amplitude M to the desired value. For example, environmental changes can cause a shift in the $V_\pi$ voltage of the phase modulator (i.e., the voltage applied to the phase modulator to cause a $\pi$ phase shift on the light). The embodiments of the light-source systems described herein constantly monitor and control the suppressed sideband (or carrier) so that substantial suppression is consistently and stably maintained even as the environment changes. This feature reduces errors in the gyro rate output from an RFOG using the light beam sources described herein or reduces the bit error rate in an optical communication system using the light beam sources described herein.

In one implementation of this embodiment, the first frequency component of interest $\Delta f_{selected-1}$ is the beat frequency of reference beam and the first carrier frequency $f_1 = (f_0 + \Delta f_{01})$ that is offset from the reference carrier frequency $f_0$ by a first-frequency difference $\Delta f_{01}$. In another implementation of this embodiment, the first frequency component of interest $\Delta f_{selected-1}$ includes the frequencies associated with a first sideband-pair for a selected harmonic. Likewise, in one implementation of this embodiment, the second frequency component of interest $\Delta f_{selected-2}$ is the beat frequency of the reference beam and the second carrier frequency $f_2 = (f_0 + \Delta f_{02})$ that is offset from the reference carrier frequency $f_0$ by a second-frequency difference $\Delta f_{02}$. In another implementation of this embodiment, the second frequency component of interest $\Delta f_{selected-2}$ includes the frequencies associated with a second sideband-pair for a selected harmonic.

In this manner, in the stable phase modulated coherent light beam 311-B with one of the carrier frequency $(f_0 + \Delta f_{01})$ or a selected sideband of the at least one modulated-light beam is substantially suppressed.

In one implementation of this embodiment, the at least one frequency selection device is at least one electronic filter configured to filter electronic signals from the respective at least one feedback photodetector to determine at least one respective amplitude of the respective at least one frequency component of interest. In another implementation of this embodiment, the at least one frequency selection device is at least one device configured to perform a fast-Fourier-transform of the incoming electronic signals from the respective at least one feedback photodetector to determine at least one respective amplitude of the respective at least one frequency component of interest. The term "fast-Fourier-transform/filter" as used herein indicates either the electronic filter or a fast-Fourier-transform device.

In yet another implementation of this embodiment, the light-source system 25 includes an optional reference-laser modulator 213. The optional reference-laser modulator 213 is configured to modulate the reference light beam 300-B to generate a modulated-reference light beam 301-B. In such an embodiment, the modulated-reference light beam 301-B can also be coupled into an external system 175. For example, if the external system is an RFOG, the modulated-reference light beam 301-B can be locked to a resonance of the resonator of the RFOG.

Figure 2:
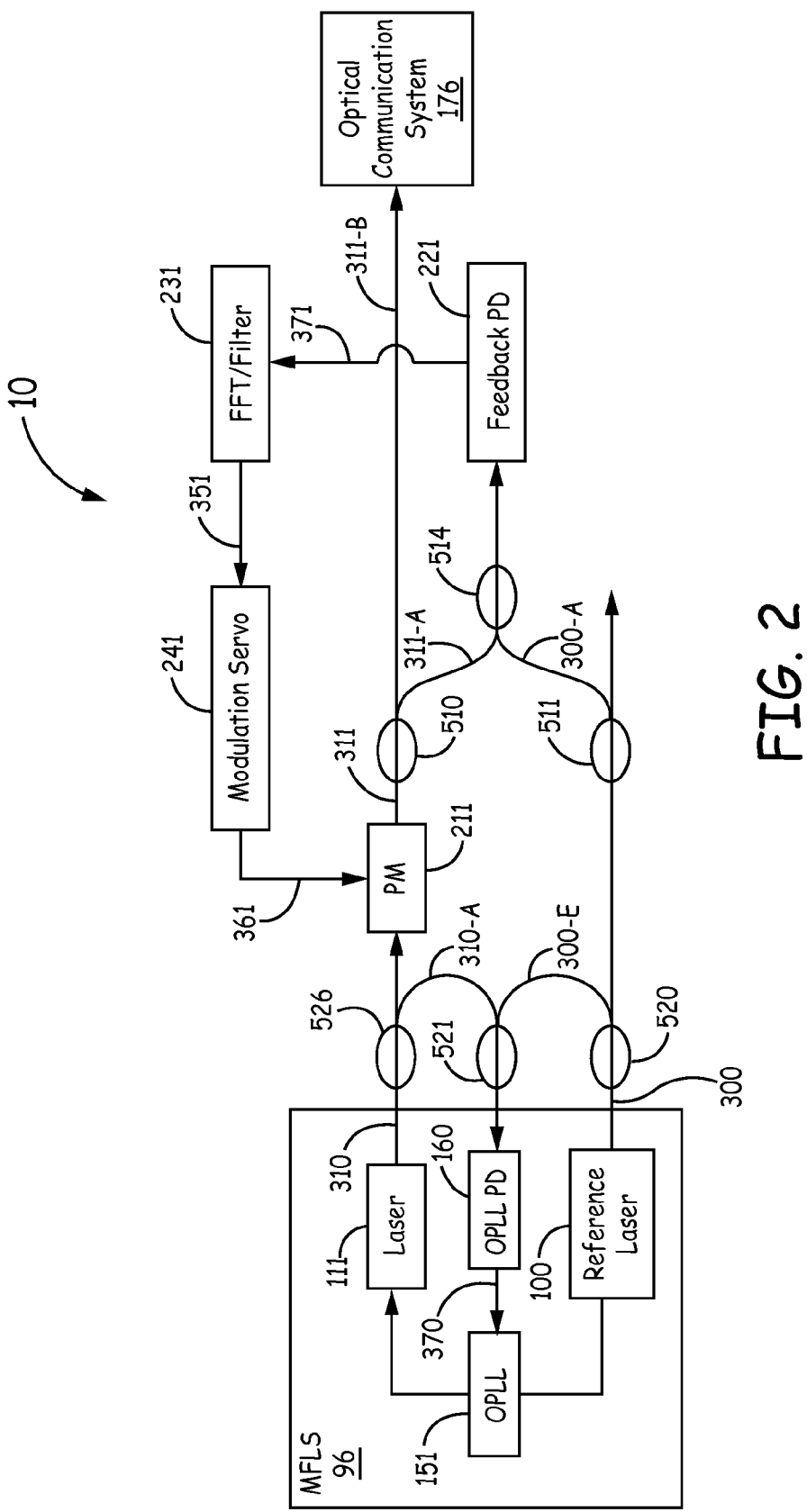
FIG. 2 is a block diagram of an embodiment of a two-laser architecture light-source system in accordance with the present application.

FIG. 2 is a block diagram of an embodiment of a two-laser light-source system 10 in accordance with the present invention. The MFLS 96 contains a reference laser 100 emitting a reference light beam 300 having a reference carrier frequency $f_0$; a first laser 111 emitting an unmodulated-light beam 310; an optical phase locked loop (OPLL) 151; an optical-phase-locked-loop photodetector 160. Similar to FIG. 1, the light source system 10 also comprises a phase modulator 211; a frequency-selection device 231; a feedback photodetector 221, and a modulation servo 241.

The light-source system 10 is configured to selectively suppress in a modulated laser beam, an electric field component at one of a carrier frequency or frequencies associated with a selected sideband-pair, and is configured to emit a modulated optical beam (modulated light beam) and an unmodulated optical beam (unmodulated light beam). The light-source system 10 in a two-laser architecture includes a reference laser 100 emitting a reference light beam 300 having a reference carrier frequency $f_0$ and one other laser 111 emitting an unmodulated-light beam 310.

The laser 111 emits an unmodulated-light beam 310 having a fixed carrier frequency $f_1$ offset from the reference carrier frequency $f_0$ by a respective at least one frequency difference $\Delta f_0$. The optical phase locked loop 151 is configured to control the frequency difference $\Delta f_0$ between the laser 111 and the reference laser 100. The optical-phase-locked-loop photodetector 160 provides signal 370 to the optical phase locked loop 151 with information indicative of beat frequencies between the reference carrier frequency $f_0$ and the carrier frequency $f_1$ of the unmodulated-light beam 310 emitted from the laser 111.

The phase modulator 211 modulates the unmodulated-light beam 310 from the laser 111. The feedback photodetector 221 provides signal 371 to the frequency-selection device 231 with information indicative of beat frequencies between the reference light beam 300 and the modulated-light beam 311.

The frequency-selection device 231 is configured to monitor a selected frequency. In one implementation of this embodiment, the frequency selection device 231 is an electronic filter 231 configured to filter electronic signals 371 from the feedback photodetector 221 to determine an amplitude of the frequency component of interest $\Delta f_{selected}$. In another implementation of this embodiment, the frequency selection device 231 is a device 231 configured to perform a fast-Fourier-transform of the incoming electronic signals 371 from the feedback photodetector 221 to determine an amplitude of the frequency component of interest $\Delta f_{selected}$. The frequency component of interest is a frequency difference $\Delta f_{selected}$ between the carrier frequency $f_0$ of the reference laser 100 and one of: the carrier frequency $(f_0 + \Delta f)$ of the at least one other laser 111; or the frequency $(f_0 + \Delta f_{+1})$ and the frequency ($f_0+\Delta f_{-1}$), which are the frequencies associated with a selected sideband-pair of the modulated-light beam 311.

Specifically, the frequency-selection device 231 monitors one of the fixed carrier frequency of the laser 111 or frequencies associated with a selected sideband-pair that are generated by the modulation of the laser 111. The selected frequency is the associated with the carrier or sideband which is suppressed by the light-source system 10. If the frequency-selection device 231 detects any electrical signal at the selected frequency, a correction signal 351 is sent from the frequency-selection device 231 to the modulation servo 241. Responsive to the correction signal 351, the first-modulation servo 241 sends an adjustment signal 361 to the phase modulator 211.

FIG. 3A shows an exemplary relationship between the carrier frequency $f_0$ of the reference laser 100 and the carrier frequency ($f_0+\Delta f_0$) of the first laser 110 in the two-laser light-source system 10 of FIG. 2. The reference laser 100 emits light beam with an electric field amplitude represented generally by the length of the arrow 400 at an optical carrier frequency $f_0$. The first laser 111 emits light beam with an electric field amplitude represented generally by the length of the arrow 410 at an optical carrier frequency ($f_0+\Delta f_0$). Typically, $\Delta f_0$ is on the order of megahertz or gigahertz. The optical-phase-locked-loop photodetector 160 detects a beat frequency between the optical frequencies shown in FIG. 3A.

As shown in FIG. 2, the coupler 526 directs a portion 310-A of the unmodulated-light beam 310 to a coupler 521. Likewise, a coupler 520 directs a portion 300-E of the unmodulated reference light beam 300 to the coupler 521. The coupler 521 combines the portion 310-A of the unmodulated-light beam 310 and portion 300-E of the unmodulated reference light beam 300 and directs it to the optical-phase-locked-loop photodetector 160. In this manner, the optical-phase-locked-loop photodetector 160 detects the beat signals between the optical frequencies shown in FIG. 3A. The optical-phase-locked-loop photodetector 160 sends correction signal 371, as needed, to maintain the frequency offset of $\Delta f_0$ between the carrier frequency $f_0$ of the reference laser 100 and the carrier frequency ($f_0+\Delta f_0$) of the first laser 110.

The couplers described herein can be optical couplers formed from optical fibers with a fused core section. Other types of optical couplers can be used to direct the light beam including optical couplers configured with various optical components known in the art, e.g., directional couplers, optical beam splitters and mirrors.

FIG. 3B shows an exemplary relationship between the carrier frequency $f_0$ of the reference laser 100 and frequencies associated with three exemplary sideband-pairs U1/L1, U2/L2, and U3/L3 of the modulated-light beam 311. As in FIG. 3A, the reference laser 100 emits light beam with the electric field amplitude 400 at an optical carrier frequency $f_0$. As shown in FIG. 3B, the carrier frequency component (at $f_0+\Delta f_0$) of the first laser 111 is suppressed by modulation. The first laser 111 emits light beam in sidebands U-1, U-2, U-3, L1, L-2, and L-3 with electric field component amplitudes represented generally by the length of the arrows associated with the respective sidebands U-1, U-2, U-3, L1, L-2, and L-3. The sidebands U-1 and L-1 are a first sideband-pair U1/L1. The sideband U-2 and L2 are a second sideband-pair U2/L2. The sidebands U-3 and L-3 are a third sideband-pair U3/L3.

As shown in FIG. 2, a portion of the unmodulated-light beam 310 is directed to the phase modulator 211 via the coupler 526. Modulated-light beam 311 is output from the phase modulator 211. A coupler 510 directs a portion 311-A of the modulated-light beam 311 to the coupler 514. Likewise, the coupler 511 directs a portion 300-A of the unmodulated reference light beam 300 to the coupler 514. The coupler 514 combines the portion 311-A of the modulated-light beam 311 and portion 300-A of the unmodulated reference light beam 300 and directs the combined light beam to the feedback photodetector 221.

In this manner, the feedback photodetector 221 detects the beat signals between the optical frequencies shown in FIG. 3B. The feedback photodetector 221 sends signal 371 with information indicative of the beat frequencies between carrier frequency $f_0$ of the reference light beam 300, the carrier frequency $f_0'=(f+\Delta f_0)$, and the frequencies of the sidebands U-1, U-2, U-3, L1, L-2, L-3 generated by modulation of the light beam 310.

The beat frequency of $\Delta f_0$ is monitored by the frequency-selection device 231 for the case when the carrier frequency $f_0'=(f+\Delta f_0)$ is suppressed. In this case, the frequency-selection device 231 is configured to monitor the beat signal amplitude at $\Delta f_0$ and to send feedback to the modulation servo 241, as needed, to adjust the modulation amplitude applied to the phase modulator 211 so that the electric field at the fixed carrier frequency ($f_0+\Delta f_0$) is substantially suppressed in the modulated-light beam 311. When the beat signal magnitude at the beat frequency $\Delta f_0$ is zero, the electric field component at carrier frequency of ($f_0+\Delta f_0$) of the first laser 111 is completely suppressed.

FIG. 3C shows an exemplary relationship between the carrier frequency $f_0$ of the reference laser 100, the carrier frequency ($f_0+\Delta f_0$) of the first laser 111 and frequencies associated with two sideband-pairs U2/L2, U3/L3 of the first laser 111. As shown in FIG. 3C, the first laser 111 is modulated to suppress the electric field components at frequencies associated with the first order sideband-pair U1/L1 (FIG. 3B) of the modulated-first light beam 311 from the first laser 111. In this case, frequencies $\Delta f_{-1}$ and the frequency MA (e.g., the frequencies associated with the first sideband-pair U1/L1) are monitored by the frequency-selection device 321 because their signal strengths are a direct indication of the level of suppression of the +1 sideband (U-1) at the frequency ($f_0+\Delta f_{+1}$) and the −1 sideband (L−1) at the frequency ($f_0+\Delta f_{-1}$).

As described above, the coupler 514 combines the portion 311-A of the modulated-light beam 311 and portion 300-A of the unmodulated reference light beam 300 and directs the combined light beam to the feedback photodetector 221. The feedback photodetector 221 detects the beat frequencies between the carrier frequency $f_0$ of the reference laser 100, the carrier frequency ($f_0+\Delta f_0$) of the first laser 111 and sidebands U-2, U-3, L-2, and L-3 of the first laser 111 optical frequencies as shown in FIG. 3C. The feedback photodetector 221 sends signal 371 with information indicative of the beat frequencies to the frequency-selection device 231.

In this case, the frequency-selection device 231 is configured to monitor the frequencies $\Delta f_{+1}$ or $\Delta f_{-1}$ and to send feedback (control signal 351) to the modulation servo 241, as needed. Responsive to control signal 351, the modulation servo 241 adjusts the modulation amplitude applied to the phase modulator 211 so that the frequencies $\Delta f_{+1}$ or $\Delta f_{-1}$ are substantially suppressed in the beat note. When the beat signal magnitudes at the beat frequencies $\Delta f_{+1}$ or $\Delta f_{-1}$ are zero, electric field amplitudes associated with first sideband-pair U1/L1 of the first laser 111 are completely suppressed.

As is understandable to one skilled in the art upon reading this document, the amplitude of phase modulation applied to the light beam 310 emitted from the first laser 111 can be modulated by the phase modulator 211 to suppress other sidebands (e.g., sidebands U-2 and L-2 of sideband-pair U2/L2 of the modulated-light beam 311. As is understandable to one skilled in the art upon reading this document, the phase modulator 211 can be controlled to adjust the spacing between the sidebands U-1, U-2, U-3, L1, L-2, and L-3.

Figure 4:
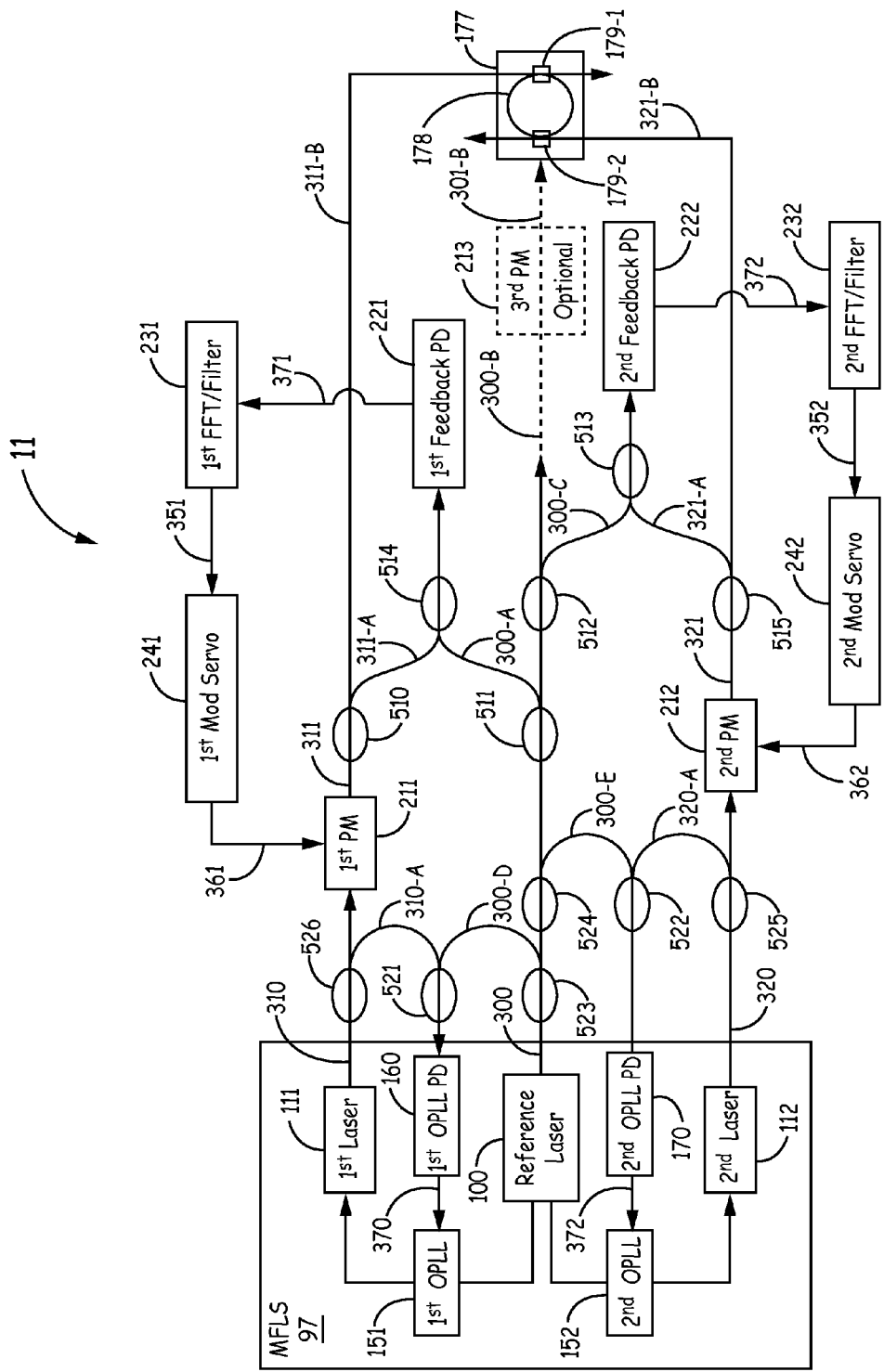
FIG. 4 is a block diagram of an embodiment of a three-laser architecture light-source system in accordance with the present application.

FIG. 4 is a block diagram of an embodiment of a three-laser light-source system 11 in accordance with the present application. The light-source system 11 differs from the light-source system 10 of FIG. 2 in that the light beam 310 and 320 from two respective lasers (first laser 111 and second laser 112) are modulated by two respective phase modulators 211 and 212. The structure and function of the components operating on the reference light beam 300 from the first laser 111 in conjunction with the reference light beam 300 from the reference laser 100 are the same as that described above with reference to FIGS. 1, 2A, 2B, and 2C. The structure and function of the components operating on the light beam 320 from the second laser 112 in conjunction with the reference light beam 300 from the reference laser 100 are similar to that described above with reference to FIGS. 1, 2A, 2B, and 2C.

The light-source system 11 is configured to selectively suppress, in each of two modulated lasers 111 and 112, either an electric field component at a carrier frequency or the electric field components at frequencies associated with a selected sideband-pair. The light-source system 11 is also configured to emit two modulated optical beams 311 and 321, respectively, and a single unmodulated optical beam 300. In one implementation of this embodiment, the two modulated optical beams 311 and 321 have different carrier frequencies ($f_0 + \Delta f_{0-1}$) and ($f_0 + \Delta f_{0-2}$), which are offset by different amounts $\Delta f_{0-1}$ and $\Delta f_{0-2}$, respectively, from the carrier frequency $f_0$ of the unmodulated reference laser 100. In another implementation of this embodiment, the two modulated optical beams 311 and 321 have the same carrier frequency ($f_0 + \Delta f_0$), which is offset by $\Delta f_0$ from the carrier frequency $f_0$ of the unmodulated laser.

The MFLS 97 contains a reference laser 100 emitting a reference light beam 300 having a reference carrier frequency $f_0$; a first laser 111, a second laser 112; a first optical phase locked loop (OPLL) 151; a second optical phase locked loop (OPLL) 152; a first optical-phase-locked-loop photodetector 160; and a first optical-phase-locked-loop photodetector 170. The light-source system 11 shown in FIG. 4 includes the reference laser 100 emitting the reference light beam 300 having a reference carrier frequency $f_0$, the components operating on the first light beam 310, and the components operating on the second light beam 320.

The components operating on the first light beam include the first laser 111 emitting an unmodulated-light beam 310, the first-optical-phase-locked-loop 151, the first optical-phase-locked-loop photodetector 160, a first phase modulator 211, a first frequency-selection device 231, a first feedback photodetector 221, and a first modulation servo 241. The functions of the components operating on the first light beam 310 were described above with reference to FIG. 2 and are not repeated.

Similarly, the components operating on the second light beam include the second laser 112 emitting an unmodulated-second light beam 321, the second-optical-phase-locked-loop 152, the second-optical-phase-locked-loop photodetector 170, a second phase modulator 212, a second frequency-selection device 232, second-feedback photodetector 222, a second-modulation servo 242. The light-source system 11 also includes various couplers 510-515 and 521-526 to direct the light beam through the light-source system 11.

The second laser 112 emits an unmodulated-second light beam 320 having a second carrier frequency $f_2$ offset from the reference carrier frequency $f_0$ by a second a frequency difference $\Delta f_{02}$. The second-optical-phase-locked-loop photodetector 170 provides, to the second-optical-phase-locked-loop 152, information indicative of beat frequencies between the reference light beam 300 and an unmodulated-second light beam 321 emitted from the second laser 112. The second phase modulator 212 modulates the unmodulated-second light beam 321. The second-feedback photodetector 222 provides, to the second frequency-selection device 232, information indicative of beat frequencies between the reference light beam 300 and the modulated-second light beam 321. The second-modulation servo 242 adjusts the modulation amplitude applied to the second phase modulator 212 so the electric field component at a second-fixed carrier frequency is suppressed or the electric field components at a frequencies associated with a selected sideband-pair are suppressed.

The light-source system 11 also includes a coupler 510 to direct a portion 311-A of the modulated-first light beam 311 to the first-feedback photodetector 221 and to direct a portion 311-B of the modulated-first light beam 311 from the light-source system 11. The portion 311-A is also referred to herein as "first portion 311-A". The portion 311-B is also referred to herein as "second portion 311-B". The portion 311-A of the modulated-first light beam 311 is combined with a portion 300-A of the reference light beam 300 before being incident on the first-feedback photodetector 221. A coupler 515 directs a portion 321-A of the modulated-second light beam 321 to the second-feedback photodetector 222 and directs a portion 321-B of the modulated-second light beam 321 from the light-source system 11. The portion 321-A of the modulated-second light beam 321 is combined with a portion 300-C of the reference light beam 300 before being incident on the second-feedback photodetector 222.

As shown in FIG. 4, a coupler 523 outputs a portion 300-D of unmodulated reference light beam 300 from the reference laser 100 to the first-optical-phase-locked-loop photodetector 160 via couple 521. A coupler 524 outputs a portion 300-E of unmodulated reference light beam 300 from the reference laser 100 to the second-optical-phase-locked-loop photodetector 170 via a coupler 522.

As shown in FIG. 4, the portion 311-B of the modulated-first light beam 311 is sequentially directed from the first laser 111, through the coupler 526, through the first phase modulator 211, and through the coupler 510 to exit the light-source system 11. As described above, either the electric field component at a at carrier frequency $f_1$ is suppressed or the electric field components at frequencies associated with a selected sideband-pair are suppressed in the modulated-first light beam 311.

As shown in FIG. 4, the portion 321-B of the modulated-second light beam 321 is sequentially directed from the second laser 112, through the coupler 525, through the second phase modulator 212, and through the coupler 515 to exit the light-source system 11. As described above, either the electric field component at carrier frequency $f_2$ is suppressed or the electric field components at frequencies associated with a selected sideband-pair are suppressed in the modulated-second light beam 321.

As shown in FIG. 4, the portion 300-B of the unmodulated reference light beam 300 is sequentially directed from the reference laser 100, through the couplers 523, 524, 511, and 512 to exit the light-source system 11.

In one implementation of this embodiment, the portion 311-B of the modulated-first light beam 311 is input to a clockwise (CW) input port 179-1 of a sensing coil 178 of an RFOG 177 while the portion 321-B of the modulated-second light beam 321 is input to a counter clockwise (CCW) input port 179-2 of the sensing coil 178 of the RFOG 177. In another implementation of this embodiment, the portion 311-B and 321-B of the modulated-first light beam 311 and 321 are input to an optical fiber in an optical communication system.

In one implementation of this embodiment, the light-source system 11 includes an optional reference-laser modulator 213. The optional reference-laser modulator 213 is configured to modulate the reference light beam 300-B to generate a modulated-reference light beam 301-B. In this case, the modulated-reference light beam 301-B is coupled into the resonator 178 of the RFOG 177 and the modulated-reference light beam 301-B is locked to a resonance of the resonator 178.

Figure 5:
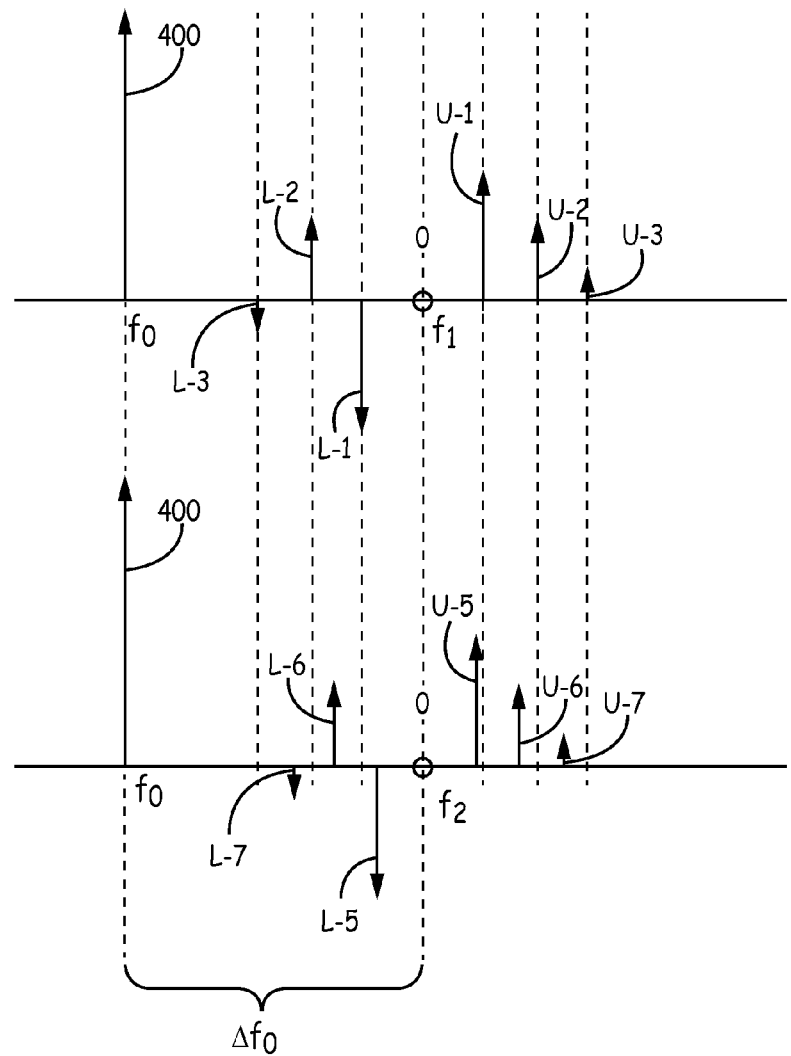
FIG. 5 shows an exemplary relationship among the carrier frequency of the reference laser, frequencies associated with three sideband-pairs of a modulated-first light beam, and frequencies associated with three sideband-pairs of a modulated-second light beam.

FIG. 5 shows an exemplary relationship among the carrier frequency $f_0$ of the reference laser 100, frequencies associated with three exemplary sideband-pairs U1/L1, U2/L2, and U3/L3 of a modulated-first light beam 311, and frequencies associated with three sideband-pairs U5/L5, U6/L6, and U7/L7 of a modulated-second light beam 312. As shown in FIG. 5, the electric field components at carrier frequencies $f_1$ and $f_2$ of the respective first laser 111 and second laser 112 are substantially suppressed. The electric field components at carrier frequencies $f_1$ and $f_2$ of the respective first laser 111 and second laser 112 are simultaneously suppressed by using beat signals generated at the first-feedback photodetector 221 and the second-feedback photodetector 222. By simultaneously suppressing the electric field components at a carrier frequencies $f_1$ and $f_2$ of the respective first laser 111 and second laser 112 with a different first modulation frequency and second modulation frequency, the sideband-pairs of the modulated-first light beam and the sideband-pairs of the modulated-second light beam are offset in frequency from each other. Specifically, the frequencies associated with the sidebands U-1, U-2, U-3, L1, L-2, and L-3 do not overlap with the frequencies associated with the sidebands U-5, U-6, U-7, L5, L-6, and L-7 even when their carrier frequencies are locked to the same cavity resonance of an RFOG 177. This technique is used to prevent interference effects that can degrade the performance of an RFOG 177. The carrier suppressed modulated-first light beam 311-B and the carrier suppressed modulated-second light beam 321-B can be launched in counter propagating directions via coupler 179-1 and 179-2 into the resonator 178 of the RFOG 177 in order to measure the resonance frequency difference and to detect the rotation rate of the RFOG 177.

Figure 6:
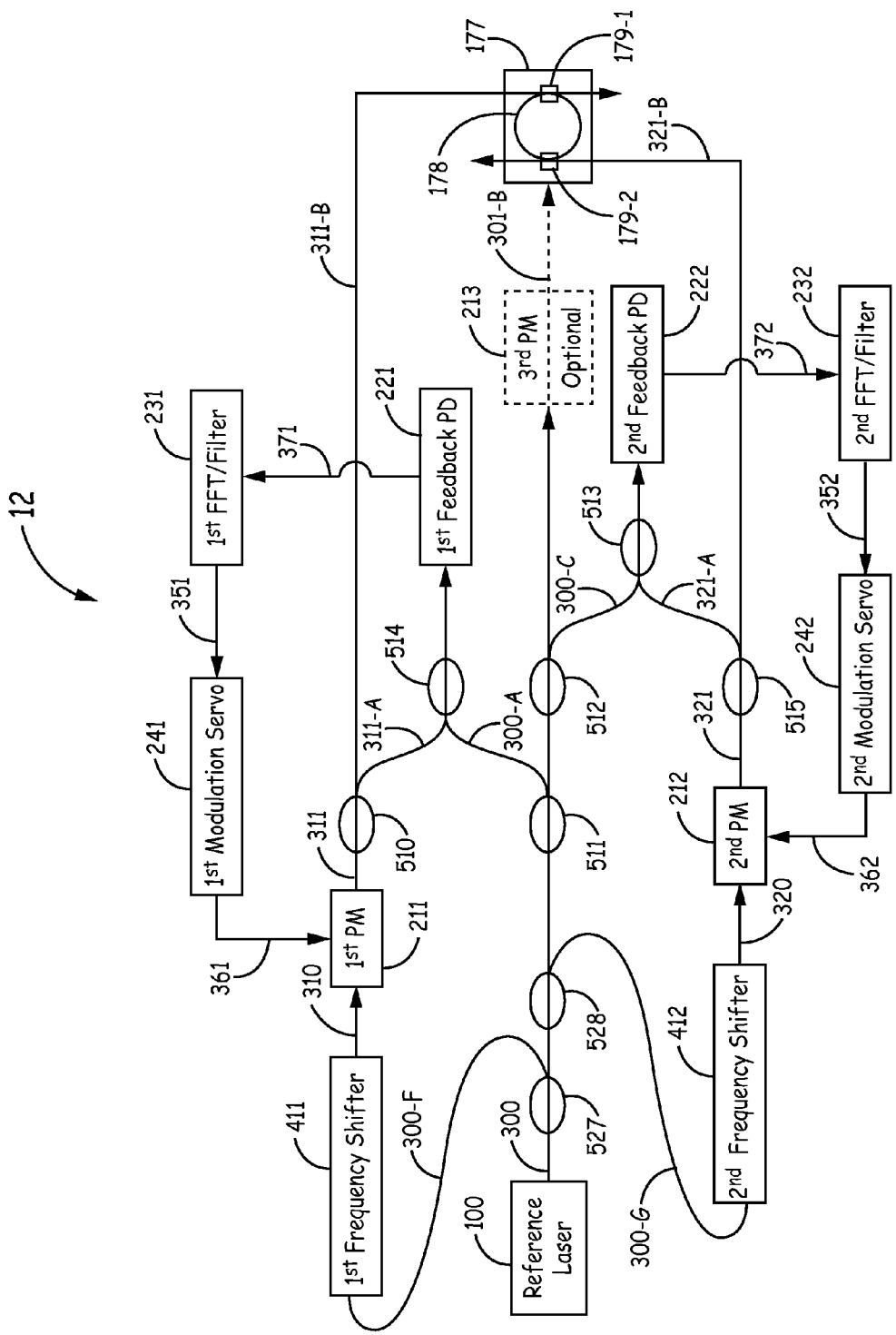
FIG. 6 is a block diagram of an embodiment of a single-laser architecture light-source system in accordance with the present application.

FIG. 6 is a block diagram of an embodiment of a light-source system 12 in accordance with the present application. Embodiments that include a single-laser to output at least one stable phase modulated coherent light beam include at least one frequency shifter to shift a respective at least one portion of the reference light beam to at least one other frequency offset from the reference carrier frequency by at least one respective frequency difference.

As shown in FIG. 6, the light-source system 12 includes a first-frequency shifter 411 and a second-frequency shifter 412. The first-frequency shifter 411 shifts a portion 300-F of the reference light beam 300 to a first frequency $f_1$ offset from the reference carrier frequency $f_0$ by a first-frequency difference $\Delta f_{01}$. The second-frequency shifter 412 shifts a portion 300-G of the reference light beam 300 to a second frequency F2 offset from the reference carrier frequency $f_0$ by a second-frequency difference $\Delta f_{02}$. In one implementation of this embodiment, first-frequency difference $\Delta f_{01}$ may equal second-frequency difference $\Delta f_{02}$.

In this manner, the first-frequency shifter 411, like the first laser 111 in the light-source system 11 described above with reference to FIG. 4, provides a unmodulated-first light beam 310 having a respective at least one carrier frequency $f_1$ offset from the reference carrier frequency by a respective at least one frequency difference $\Delta f_0$. Likewise, the second-frequency shifter 412, like the second laser 112 in the light-source system 11 described above with reference to FIG. 4, provides a unmodulated-second light beam 320 having a respective at least one carrier frequency $f_2$ offset from the reference carrier frequency by a respective at least one frequency difference $\Delta f_0$.

The other components in the light-source system 12 are similar in structure and function to the components in the light-source system 11 shown in FIG. 4 as is understandable to one skilled in the art.

In one implementation of this embodiment, the unmodulated-first light beam 310 from the first-frequency shifter 411 and the unmodulated-second light beam 320 from the second-frequency shifter 412 are generated by frequency shift of the reference light beam 300. The modulated-first light beam 311-B is coupled via the CW input port 179-1 of a sensing coil 178 into a sensing coil 178 of an RFOG 177 in a clockwise direction. The modulated-second light beam 321-B is coupled via the CCW input port 179-2 of the sensing coil 178 into the sensing coil 178 in a CCW direction. The RFOG 177 measures a rotation rate of the resonator 178. As described above, with reference to FIG. 4, an optional reference-laser modulator 213 can be configured to modulate the reference light beam 300, and the modulated-reference light beam 301-B is coupled into the sensing coil 178 of the RFOG 177 and locked to a resonance of the sensing coil 178.

Figure 7:
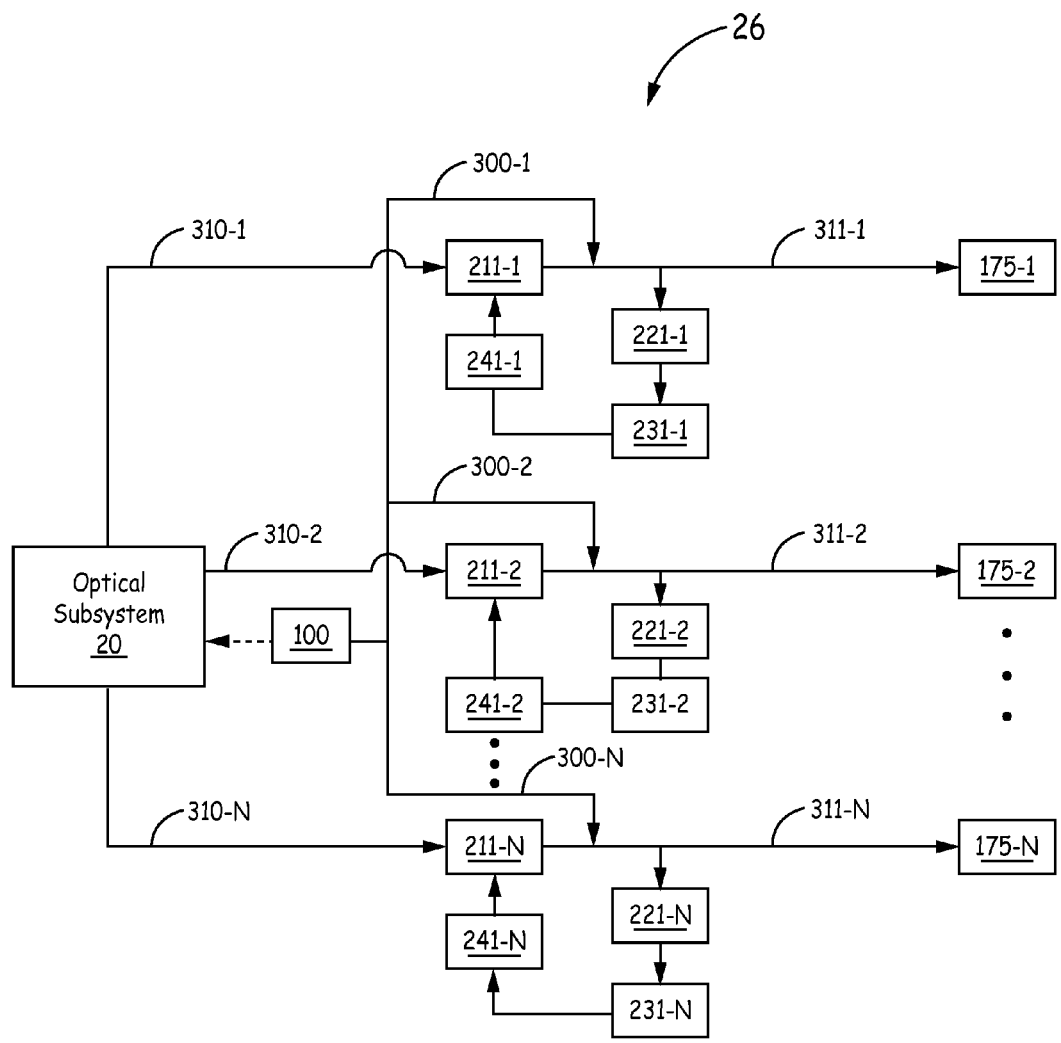
FIG. 7 is a block diagram of an embodiment of a light-source system for a plurality of external systems in accordance with the present application.

FIG. 7 is a block diagram of an embodiment of a light-source system 26 for a plurality of external systems 175(1-N) in accordance with the present application. The light-source system 26 includes a reference laser 100, an optical sub-system 20 to provide a plurality of unmodulated-light beams 310(1-N) having a respective at least one fixed carrier frequency that is offset from the reference carrier frequency by a respective at least one frequency difference $\Delta f_0$. The light-source system 26 outputs a plurality of stable phase modulated coherent light beams 311(1-N) to a plurality of external system 175(1-N). In one implementation of this embodiment, pairs of the stable phase modulated coherent light beams (e.g., light beam 311-1 and light beam 311-2) are output to a single RFOG 177 as shown above with reference to FIG. 4.

The light-source system 26 includes a plurality of phase modulators 211(1-N), a plurality of feedback photodetectors 211(1-N), a plurality of frequency-selection devices 231(1-N), and a plurality of modulation servos 241(1-N).

The plurality of phase modulators 211(1-N) modulate the respective plurality of unmodulated-light beams 310(1-N) output from the optical sub-system 20. The plurality of frequency-selection devices 231(1-N) monitor a respective plurality of frequency components of interest $\Delta f_{selected(1-N)}$.

The plurality of feedback photodetectors 221(1-N) provide, to the respective at least frequency-selection device 231(1-N), information indicative of beat frequencies between the reference light beam 300(1-N) and the plurality of modulated-light beam 311(1-N).

The plurality of modulation servos 241(1-N) adjust a modulation amplitude applied to the respective plurality of phase modulators 211(1-N). The plurality of phase modulators 211(1-N) each substantially suppress either the carrier frequency or the frequencies of a selected sideband-pair of the modulated-light beam 311(1-N). In one implementation of this embodiment, a plurality of lasers each emit unmodulated-light beam 310 having a respective at least one fixed carrier frequency $f_1$ offset from the reference carrier frequency $f_0$ by the same frequency difference $\Delta f_0$. In another implementation of this embodiment, a plurality of lasers each emit unmodulated-light beam 310 having a respective at least one fixed carrier frequency $f_1$ offset from the reference carrier frequency $f_0$ by a respective plurality of frequency differences $\Delta f_{O1}, \Delta f_{O2} \ldots \Delta f_{On}$, etc.

The light-source systems described herein can used to provide at least one stable phase modulated coherent light beam as required in any applications that require at least one stable phase modulated coherent light beam.

Figure 8:
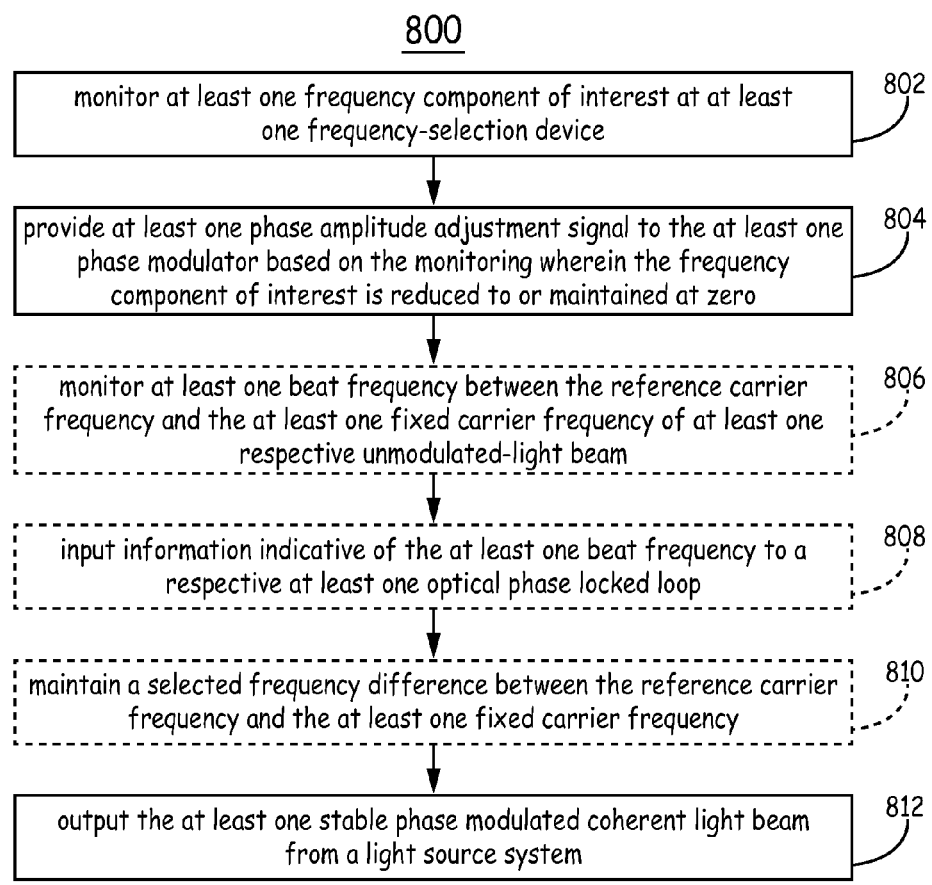
FIG. 8 is a flow diagram of an embodiment of a method to stably suppress a selected one of a fixed-carrier frequency or a sideband of modulated light.

FIG. 8 is a flow diagram of an embodiment of a method 800 to stably suppress a selected electric field component at one of a fixed-carrier frequency or a sideband of modulated light. The method 800 is applicable to any of the embodiments of light-source systems described herein including the light-source systems 25, 10, 11, 12, and 26 of FIGS. 1, 2, 4, 6, and 7, respectively.

At block 802, at least one frequency component of interest is monitored at at least one frequency-selection device. The at least one frequency component of interest is at least one beat signal between a reference laser wave at a carrier frequency and one of: a laser wave at a fixed carrier frequency; or electric field components of a laser wave at a frequencies associated with a selected sideband-pair. The reference carrier frequency is associated with a reference light beam emitted by a reference laser. The at least one fixed carrier frequency is associated with at least one respective unmodulated-light beam. The frequencies associated with at least one selected sideband-pair are associated with the at least one respective unmodulated-light beam after modulation by at least one phase modulator.

At block 804, at least one phase amplitude adjustment signal is provided to the at least one phase modulator based on the monitoring. The monitoring is used to reduce to zero (or maintain at zero) the frequency component of interest.

Block 806 is optional. At block 806, at least one beat frequency is optionally monitored between the reference carrier frequency and the at least one fixed carrier frequency of at least one respective unmodulated-light beam. Block 808 is optional and is only performed if block 806 is performed. At block 808, information indicative of the at least one beat frequency between the reference carrier frequency and the at least one fixed carrier frequency of at least one respective unmodulated-light beam is optionally input to a respective at least one optical phase locked loop. Block 810 is optional and is only performed if blocks 806 and 808 are performed. At block 810, a selected frequency difference is maintained between the reference carrier frequency and the at least one fixed carrier frequency. The maintained difference is based on information indicative of the at least one beat frequency input to the respective at least one optical phase locked loop.

At block 812, the at least one stable phase modulated coherent light beam is output from the light-source system that performed the function of blocks 802 and 804.

Figure 9:
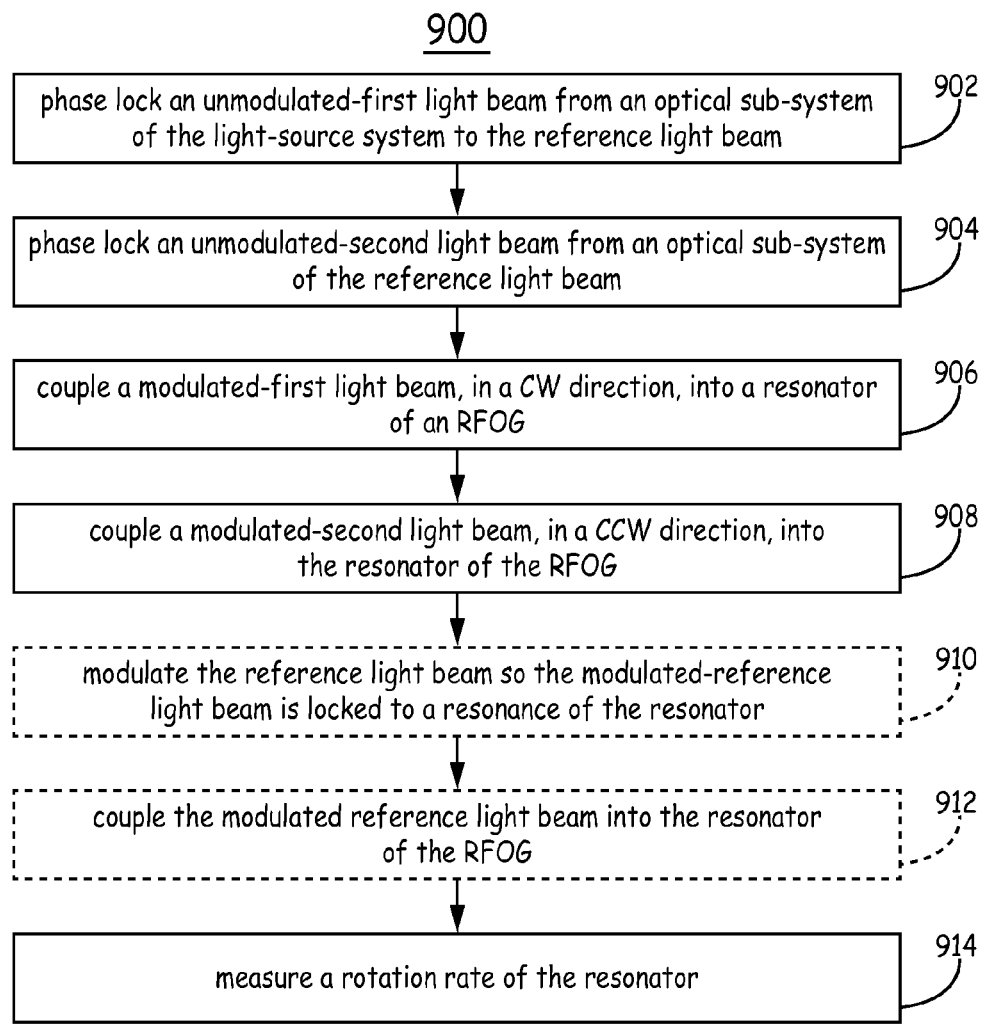
FIG. 9 is a flow diagram of an embodiment of a method to output a stable phase modulated coherent light beam to an RFOG.

FIG. 9 is a flow diagram of an embodiment of a method 900 to output a stable phase modulated coherent light beam to an RFOG. The method 900 is applicable to any of the embodiments of light-source systems coupled to RFOG's described herein including the light-source systems 25, 11, 12, and 26 of FIGS. 1, 4, 6, and 7, respectively. The method 900 is implemented after method 800 is performed.

At block 902, an unmodulated-first light beam from an optical sub-system of the light-source system is phase locked to the reference light beam. At block 904, an unmodulated-second light beam from the optical sub-system is phase locked to the reference light beam.

At block 906, a modulated-first light beam is coupled, in a clockwise direction, into a resonator of the RFOG. At block 908, a modulated-second light beam is coupled, in a counter-clockwise direction, into the resonator of the RFOG.

Blocks 910 and 912 are optional. At block 910, the reference light beam is modulated so that modulated-reference light beam is locked to a resonance of the resonator. At block 912, the modulated reference light beam is coupled into the resonator of the RFOG. The modulated reference light beam is coupled into the resonator of the RFOG via either the CCW input port or the CW input port of the resonator.

At block 914, a rotation rate of the resonator is measured.

Example Embodiments

Example 1 includes a light-source system to output at least one stable phase modulated coherent light beam, the light-source system comprising: a multi-frequency laser system that emits a reference light beam having a reference carrier frequency; and provides at least one unmodulated-light beam phase locked to the reference beam having a respective at least one carrier frequency that is offset from the reference carrier frequency by a respective at least one frequency difference; at least one phase modulator to modulate the respective at least one unmodulated-light beam provided by the multi-frequency laser system; at least one frequency-selection device to monitor a respective at least one frequency component of interest; at least one feedback photodetector to provide, to the respective at least frequency-selection device, information indicative of beat frequencies between the reference light beam and the at least one modulated-light beam; and at least one modulation servo to adjust a modulation amplitude applied to the respective at least one phase modulator to substantially suppress one of: the respective electric field at at least one carrier frequency; or the electric field components at the frequencies associated with a selected sideband-pair of the at least one modulated-light beam.

Example 2 includes the light-source system of Example 1, wherein the at least one frequency selection device is at least one electronic filter configured to filter electronic signals from the respective at least one feedback photodetector to determine at least one respective amplitude of the respective at least one frequency component of interest, wherein the at least one frequency component of interest is at least one frequency difference between the carrier frequency of a reference laser and one of: the at least one carrier frequency of the at least one modulated-light beam; or the frequencies associated with the selected sideband-pair of the modulated-light beam.

Example 3 includes the light-source system of any of Examples 1-2, wherein the at least one frequency selection device is at least one device configured to perform a fast-Fourier-transform of the incoming electronic signals from the respective at least one feedback photodetector to determine at least one respective amplitude of the respective at least one frequency component of interest, wherein the at least one frequency component of interest is at least one frequency difference between the carrier frequency of a reference laser and one of: the at least one carrier frequency of the at least one modulated-light beam; or the frequencies associated with the selected sideband-pair of the modulated-light beam.

Example 4 includes the light-source system of any of Examples 1-3, wherein an optical sub-system in the multi-frequency laser system includes: a first laser emitting an unmodulated-first light beam having a fixed-first carrier frequency that is offset from the reference carrier frequency by a first-frequency difference; a first-optical-phase-locked-loop; and a first-optical-phase-locked-loop photodetector to provide, to the first-optical-phase-locked-loop, information indicative of a beat frequency between the reference light beam and the unmodulated-first light beam emitted from the first laser; wherein the at least one phase modulator includes a first phase modulator to modulate the unmodulated-first light beam, wherein the at least one frequency-selection device includes a first frequency-selection device to monitor a first-frequency component of interest, wherein the at least one feedback photodetector includes a first-feedback photodetector to provide, to the first frequency-selection device, information indicative of beat frequencies between the reference light beam and the modulated-first light beam, and wherein at least one modulation servo includes a first modulation servo to adjust a first modulation amplitude applied to the first phase modulator to substantially suppress one of: the electric field at the first-fixed carrier frequency; or the electric field components at the frequencies associated with the selected sideband-pair of the modulated-first light beam.

Example 5 includes the light-source system of Example 4, wherein the optical sub-system further includes: a second laser emitting an unmodulated-second light beam having a fixed-second carrier frequency that is offset from the reference carrier frequency by a second-frequency difference; a second-optical-phase-locked-loop; and a second-optical-phase-locked-loop photodetector to provide, to the second-optical-phase-locked-loop, information indicative of a beat frequency between the reference light beam and the unmodulated-second light beam emitted from the second laser, wherein the at least one phase modulator further includes a second phase modulator to modulate the unmodulated-second light beam, wherein the at least one frequency-selection device further includes a second frequency-selection device to monitor a second-frequency component of interest, wherein the at least one feedback photodetector further includes a second-feedback photodetector to provide, to the second frequency-selection device, information indicative of beat frequencies between the reference light beam and the modulated-second light beam, and wherein at least one modulation servo includes a second modulation servo to adjust a second modulation amplitude applied to the second phase modulator to substantially suppress one of: the amplitude of the electric field at the second-fixed carrier frequency; or amplitudes of the electric field components at the frequencies associated with the selected sideband-pair of the modulated-second light beam.

Example 6 includes the light-source system of Example 5, wherein the unmodulated-first light beam from the first laser and the unmodulated-second light beam from the second laser are phase locked to the reference light beam, wherein the modulated-first light beam is coupled, in a clockwise direction, into a resonator of a resonator fiber optic gyroscope (RFOG), and wherein the modulated-second light beam is coupled, in a counter-clockwise direction, into the resonator of the RFOG.

Example 7 includes the light-source system of Example 6, wherein sideband-pairs of the modulated-first light beam and sideband-pairs of the modulated-second light beam are offset in frequency from each other.

Example 8 includes the light-source system of any of Examples 6-7, further comprising: a reference-laser modulator configured to modulate the reference light beam, wherein the modulated-reference light beam is coupled into the resonator of the RFOG and locked to a resonance of the resonator.

Example 9 includes the light-source system of any of Examples 1-8, wherein multi-frequency laser system to provide at least one unmodulated optical light beam includes: at least one frequency shifter to shift a respective at least one portion of the reference light beam to at least one other frequency that is offset from the reference carrier frequency by at least one respective frequency difference.

Example 10 includes the light-source system of Example 9, wherein the at least one frequency shifter includes: a first-frequency shifter to shift a first portion of the reference light beam to a first frequency that is offset from the reference carrier frequency by a first-frequency difference, wherein the at least one phase modulator includes a first phase modulator to modulate the unmodulated-first light beam, wherein the at least one frequency-selection device includes a first frequency-selection device to monitor a first-frequency component of interest, wherein the at least one feedback photodetector includes a first-feedback photodetector to provide, to the first frequency-selection device, information indicative of beat frequencies between the reference light beam and the modulated-first light beam, wherein at least one modulation servo includes a first modulation servo to adjust a first modulation amplitude applied to the first phase modulator to substantially suppress one of: the amplitude of the electric field at the first-fixed carrier frequency; or amplitudes of the electric field components at the frequencies associated with a selected sideband-pair of the modulated-first light beam.

Example 11 includes the light-source system of Example 10, wherein the at least one frequency shifter further includes: a second-frequency shifter to shift a second portion of the reference light beam to a second frequency that is offset from the reference carrier frequency by a second-frequency difference, wherein the at least one phase modulator further includes a second phase modulator to modulate the unmodulated-second light beam, wherein the at least one frequency-selection device further includes a second frequency-selection device to monitor a second-frequency component of interest, wherein the at least one feedback photodetector further includes a second-feedback photodetector to provide, to the second frequency-selection device, information indicative of beat frequencies between the reference light beam and the modulated-second light beam, wherein at least one modulation servo further includes a second modulation servo to adjust a second modulation amplitude applied to the second phase modulator to substantially suppress one of: the amplitude of the electric field at the second-fixed carrier frequency; or amplitudes of the electric field components at the frequencies associated with a selected sideband-pair of the modulated-second light beam.

Example 12 includes the light-source system of Example 11, wherein the unmodulated-first light beam from the first-frequency shifter and the unmodulated-second light beam from the second-frequency shifter are phase locked to the reference light beam, wherein the modulated-first light beam is coupled, in a clockwise direction, into a resonator of a resonator fiber optic gyroscope (RFOG), and wherein the modulated-second light beam is coupled, in a counter-clockwise direction, into the resonator of the RFOG to measure the rotation rate of the resonator.

Example 13 includes the light-source system of Example 12, further comprising: a reference-laser modulator configured to modulate the reference light beam, wherein the modulated-reference light beam is coupled into the resonator of the RFOG and locked to a resonance of the resonator.

Example 14 includes a method to stably suppress a selected component of the electric field at least one frequency of at least one modulated-light beam, the method comprising: monitoring at least one frequency component of interest at at least one frequency-selection device, the at least one frequency component of interest being at least one beat signal between a reference carrier frequency and one of: a fixed carrier frequency; or frequencies associated with a selected sideband-pair, wherein the reference carrier frequency is associated with a reference light beam emitted by a reference laser in a light-source system, and wherein the at least one fixed carrier frequency is associated with at least one respective unmodulated-light beam, and wherein the frequencies associated with at least one selected sideband-pair are associated with the at least one respective unmodulated-light beam after modulation by at least one phase modulator; providing at least one phase amplitude adjustment signal to the at least one phase modulator based on the monitoring, wherein the frequency component of interest is reduced to or maintained at zero; and outputting the at least one stable phase modulated coherent light beam.

Example 15 includes the method of Example 14, further comprising: monitoring at least one beat frequency between the reference carrier frequency and the at least one fixed carrier frequency of at least one respective unmodulated-light beam; inputting information indicative of the at least one beat frequency between the reference carrier frequency and the at least one fixed carrier frequency of at least one respective unmodulated-light beam to a respective at least one optical phase locked loop; and maintaining a selected frequency difference between the reference carrier frequency and the at least one fixed carrier frequency based on information indicative of the at least one beat frequency input to the respective at least one optical phase locked loop.

Example 16 includes the method of Example 15, wherein outputting the at least one stable phase modulated coherent light beam comprises outputting the at least one stable phase modulated coherent light beam to least one resonator fiber optic gyroscope (RFOG), the method further comprising: phase locking an unmodulated-first light beam from an optical sub-system of the light-source system to the reference light beam; phase locking an unmodulated-second light beam from the optical sub-system to the reference light beam, coupling a modulated-first light beam, in a clockwise direction, into a resonator of the RFOG; coupling a modulated-second light beam, in a counter-clockwise direction, into the resonator of the RFOG; and measuring a rotation rate of the resonator.

Example 17 includes the method of Example 16, further comprising: modulating the reference light beam, wherein the modulated-reference light beam is locked to a resonance of the resonator; and coupling the modulated reference light beam into the resonator of the RFOG.

Example 18 includes a light-source system for stably suppressing a selected one of a fixed-carrier frequency or a sideband-pair of a phase modulated coherent light beam, the light-source system comprising: means for generating a reference light beam having a reference carrier frequency; means for generating an unmodulated-first light beam having a fixed-first carrier frequency that is offset from the reference carrier frequency by a first-frequency difference; means for modulating the unmodulated-first light beam; means for monitoring a first-frequency component of interest; means for adjusting a first modulation amplitude applied to the means for modulating the unmodulated-first light beam; means for generating an unmodulated-second light beam having a fixed-second carrier frequency that is offset from the reference carrier frequency by a second-frequency difference; means for modulating the unmodulated-second light beam; means for monitoring a second-frequency component of interest; and means for adjusting a second modulation amplitude applied to the means for modulating the unmodulated-second light beam.

Example 19 includes the light-source system of Example 18, further comprising: means for monitoring a first beat frequency between the reference carrier frequency and the fixed-first carrier frequency of the unmodulated-first light beam; means for maintaining a first-frequency difference between the reference carrier frequency and fixed-first carrier frequency based on output form the means for monitoring the first beat frequency; means for monitoring a second beat frequency between the reference carrier frequency and the fixed-second carrier frequency of the unmodulated-second light beam; and means for maintaining a second-frequency difference between the reference carrier frequency and fixed-second carrier frequency based on output form the means for monitoring the second beat frequency.

Example 20 includes the light-source system of Example 19, further comprising: means for phase locking the unmodulated-first light beam and the unmodulated-second light beam from the second-frequency shifter to the reference light beam, means for coupling a modulated-first light beam, in a clockwise direction, into a resonator of a resonator fiber optic gyroscope (RFOG); means for coupling a modulated-second light beam, in a counter-clockwise direction, into the resonator of the RFOG; and means for measuring a rotation rate of the resonator.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A light-source system to output at least one stable phase modulated coherent light beam, the light-source system comprising:
    a multi-frequency laser system that emits a reference light beam having a reference carrier frequency; and provides at least one unmodulated-light beam phase locked to the reference beam having a respective at least one carrier frequency that is offset from the reference carrier frequency by a respective at least one frequency difference;
    at least one phase modulator to modulate the respective at least one unmodulated-light beam provided by the multi-frequency laser system;
    at least one frequency-selection device to monitor a respective at least one frequency component of interest;
    at least one feedback photodetector to provide, to the respective at least frequency-selection device, information indicative of beat frequencies between the reference light beam and the at least one modulated-light beam; and
    at least one modulation servo to adjust a modulation amplitude applied to the respective at least one phase modulator to substantially suppress one of: the respective electric field at least one carrier frequency; or the electric field components at the frequencies associated with a selected sideband-pair of the at least one modulated-light beam.

2. The light-source system of claim 1, wherein the at least one frequency selection device is at least one electronic filter configured to filter electronic signals from the respective at least one feedback photodetector to determine at least one respective amplitude of the respective at least one frequency component of interest, wherein the at least one frequency component of interest is at least one frequency difference between the carrier frequency of a reference laser and one of: the at least one carrier frequency of the at least one modulated-light beam; or the frequencies associated with the selected sideband-pair of the modulated-light beam.

3. The light-source system of claim 1, wherein the at least one frequency selection device is at least one device configured to perform a fast-Fourier-transform of the incoming electronic signals from the respective at least one feedback photodetector to determine at least one respective amplitude of the respective at least one frequency component of interest, wherein the at least one frequency component of interest is at least one frequency difference between the carrier frequency of a reference laser and one of: the at least one carrier frequency of the at least one modulated-light beam; or the frequencies associated with the selected sideband-pair of the modulated-light beam.

4. The light-source system of claim 1, wherein an optical sub-system in the multi-frequency laser system includes:
   a first laser emitting an unmodulated-first light beam having a fixed-first carrier frequency that is offset from the reference carrier frequency by a first-frequency difference;
   a first-optical-phase-locked-loop; and
   a first-optical-phase-locked-loop photodetector to provide, to the first-optical-phase-locked-loop, information indicative of a beat frequency between the reference light beam and the unmodulated-first light beam emitted from the first laser;
   wherein the at least one phase modulator includes a first phase modulator to modulate the unmodulated-first light beam,
   wherein the at least one frequency-selection device includes a first frequency-selection device to monitor a first-frequency component of interest,
   wherein the at least one feedback photodetector includes a first-feedback photodetector to provide, to the first frequency-selection device, information indicative of beat frequencies between the reference light beam and the modulated-first light beam, and
   wherein at least one modulation servo includes a first modulation servo to adjust a first modulation amplitude applied to the first phase modulator to substantially suppress one of: the electric field at the first-fixed carrier frequency; or the electric field components at the frequencies associated with the selected sideband-pair of the modulated-first light beam.

5. The light-source system of claim 4, wherein the optical sub-system further includes:
   a second laser emitting an unmodulated-second light beam having a fixed-second carrier frequency that is offset from the reference carrier frequency by a second-frequency difference;
   a second-optical-phase-locked-loop; and
   a second-optical-phase-locked-loop photodetector to provide, to the second-optical-phase-locked-loop, information indicative of a beat frequency between the reference light beam and the unmodulated-second light beam emitted from the second laser,
   wherein the at least one phase modulator further includes a second phase modulator to modulate the unmodulated-second light beam,
   wherein the at least one frequency-selection device further includes a second frequency-selection device to monitor a second-frequency component of interest,
   wherein the at least one feedback photodetector further includes a second-feedback photodetector to provide, to the second frequency-selection device, information indicative of beat frequencies between the reference light beam and the modulated-second light beam, and
   wherein at least one modulation servo includes a second modulation servo to adjust a second modulation amplitude applied to the second phase modulator to substantially suppress one of: the amplitude of the electric field at the second-fixed carrier frequency; or amplitudes of the electric field components at the frequencies associated with the selected sideband-pair of the modulated-second light beam.

6. The light-source system of claim 5, wherein the unmodulated-first light beam from the first laser and the unmodulated-second light beam from the second laser are phase locked to the reference light beam, wherein the modulated-first light beam is coupled, in a clockwise direction, into a resonator of a resonator fiber optic gyroscope (RFOG), and wherein the modulated-second light beam is coupled, in a counter-clockwise direction, into the resonator of the RFOG.

7. The light-source system of claim 6, wherein sideband-pairs of the modulated-first light beam and sideband-pairs of the modulated-second light beam are offset in frequency from each other.

8. The light-source system of claim 6, further comprising:
   a reference-laser modulator configured to modulate the reference light beam, wherein the modulated-reference light beam is coupled into the resonator of the RFOG and locked to a resonance of the resonator.

9. The light-source system of claim 1, wherein multi-frequency laser system to provide at least one unmodulated optical light beam includes:
   at least one frequency shifter to shift a respective at least one portion of the reference light beam to at least one other frequency that is offset from the reference carrier frequency by at least one respective frequency difference.

10. The light-source system of claim 9, wherein the at least one frequency shifter includes:
   a first-frequency shifter to shift a first portion of the reference light beam to a first frequency that is offset from the reference carrier frequency by a first-frequency difference,
   wherein the at least one phase modulator includes a first phase modulator to modulate the unmodulated-first light beam,
   wherein the at least one frequency-selection device includes a first frequency-selection device to monitor a first-frequency component of interest,
   wherein the at least one feedback photodetector includes a first-feedback photodetector to provide, to the first frequency-selection device, information indicative of beat frequencies between the reference light beam and the modulated-first light beam,
   wherein at least one modulation servo includes a first modulation servo to adjust a first modulation amplitude applied to the first phase modulator to substantially suppress one of: the amplitude of the electric field at the first-fixed carrier frequency; or amplitudes of the electric field components at the frequencies associated with a selected sideband-pair of the modulated-first light beam.

11. The light-source system of claim 10, wherein the at least one frequency shifter further includes:
   a second-frequency shifter to shift a second portion of the reference light beam to a second frequency that is offset from the reference carrier frequency by a second-frequency difference,
   wherein the at least one phase modulator further includes a second phase modulator to modulate the unmodulated-second light beam, wherein the at least one frequency-selection device further includes a second frequency-selection device to monitor a second-frequency component of interest, wherein the at least one feedback photodetector further includes a second-feedback photodetector to provide, to the second frequency-selection device, information indicative of beat frequencies between the reference light beam and the modulated-second light beam, wherein at least one modulation servo further includes a second modulation servo to adjust a second modulation amplitude applied to the second phase modulator to substantially suppress one of: the amplitude of the electric field at the second-fixed carrier frequency; or amplitudes of the electric field components at the frequencies associated with a selected sideband-pair of the modulated-second light beam.

12. The light-source system of claim 11, wherein the unmodulated-first light beam from the first-frequency shifter and the unmodulated-second light beam from the second-frequency shifter are phase locked to the reference light beam, wherein the modulated-first light beam is coupled, in a clockwise direction, into a resonator of a resonator fiber optic gyroscope (RFOG), and wherein the modulated-second light beam is coupled, in a counter-clockwise direction, into the resonator of the RFOG to measure the rotation rate of the resonator.

13. The light-source system of claim 12, further comprising:
a reference-laser modulator configured to modulate the reference light beam, wherein the modulated-reference light beam is coupled into the resonator of the RFOG and locked to a resonance of the resonator.

14. A method to stably suppress a selected component of the electric field at least one frequency of at least one modulated-light beam, the method comprising:
monitoring at least one frequency component of interest at least one frequency-selection device, the at least one frequency component of interest being at least one beat signal between a reference carrier frequency and one of: a fixed carrier frequency; or frequencies associated with a selected sideband-pair,
wherein the reference carrier frequency is associated with a reference light beam emitted by a reference laser in a light-source system, and
wherein the at least one fixed carrier frequency is associated with at least one respective unmodulated-light beam, and
wherein the frequencies associated with at least one selected sideband-pair are associated with the at least one respective unmodulated-light beam after modulation by at least one phase modulator;
providing at least one phase amplitude adjustment signal to the at least one phase modulator based on the monitoring, wherein the frequency component of interest is reduced to or maintained at zero; and
outputting the at least one stable phase modulated coherent light beam.

15. The method of claim 14, further comprising:
monitoring at least one beat frequency between the reference carrier frequency and the at least one fixed carrier frequency of at least one respective unmodulated-light beam;
inputting information indicative of the at least one beat frequency between the reference carrier frequency and the at least one fixed carrier frequency of at least one respective unmodulated-light beam to a respective at least one optical phase locked loop; and maintaining a selected frequency difference between the reference carrier frequency and the at least one fixed carrier frequency based on information indicative of the at least one beat frequency input to the respective at least one optical phase locked loop.

16. The method of claim 15, wherein outputting the at least one stable phase modulated coherent light beam comprises outputting the at least one stable phase modulated coherent light beam to least one resonator fiber optic gyroscope (RFOG), the method further comprising:
phase locking an unmodulated-first light beam from an optical sub-system of the light-source system to the reference light beam;
phase locking an unmodulated-second light beam from the optical sub-system to the reference light beam,
coupling a modulated-first light beam, in a clockwise direction, into a resonator of the RFOG;
coupling a modulated-second light beam, in a counter-clockwise direction, into the resonator of the RFOG; and
measuring a rotation rate of the resonator.

17. The method of claim 16, further comprising:
modulating the reference light beam, wherein the modulated-reference light beam is locked to a resonance of the resonator; and
coupling the modulated reference light beam into the resonator of the RFOG.

18. A light-source system for stably suppressing a selected one of a fixed-carrier frequency or a sideband-pair of a phase modulated coherent light beam, the light-source system comprising:
means for generating a reference light beam having a reference carrier frequency;
means for generating an unmodulated-first light beam having a fixed-first carrier frequency that is offset from the reference carrier frequency by a first-frequency difference;
means for modulating the unmodulated-first light beam;
means for monitoring a first-frequency component of interest;
means for adjusting a first modulation amplitude applied to the means for modulating the unmodulated-first light beam;
means for generating an unmodulated-second light beam having a fixed-second carrier frequency that is offset from the reference carrier frequency by a second-frequency difference;
means for modulating the unmodulated-second light beam;
means for monitoring a second-frequency component of interest; and
means for adjusting a second modulation amplitude applied to the means for modulating the unmodulated-second light beam.

19. The light-source system of claim 18, further comprising:
means for monitoring a first beat frequency between the reference carrier frequency and the fixed-first carrier frequency of the unmodulated-first light beam;
means for maintaining a first-frequency difference between the reference carrier frequency and fixed-first carrier frequency based on output form the means for monitoring the first beat frequency;
means for monitoring a second beat frequency between the reference carrier frequency and the fixed-second carrier frequency of the unmodulated-second light beam; and
means for maintaining a second-frequency difference between the reference carrier frequency and fixed-second carrier frequency based on output form the means for monitoring the second beat frequency.

20. The light-source system of claim 19, further comprising:
means for phase locking the unmodulated-first light beam and the unmodulated-second light beam from the second-frequency shifter to the reference light beam,
means for coupling a modulated-first light beam, in a clockwise direction, into a resonator of a resonator fiber optic gyroscope (RFOG);
means for coupling a modulated-second light beam, in a counter-clockwise direction, into the resonator of the RFOG; and
means for measuring a rotation rate of the resonator.

* * * * *